Patented May 31, 1932

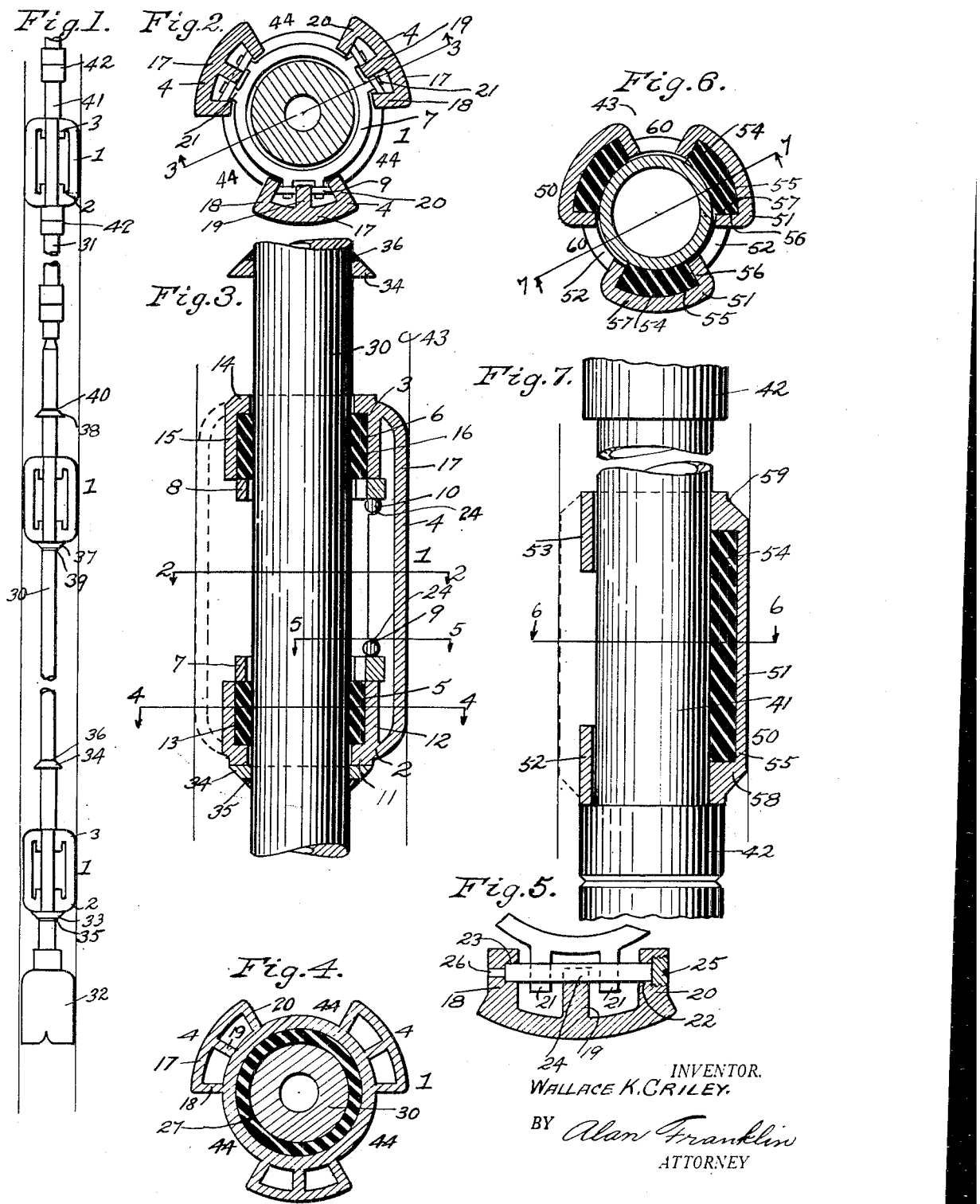

1,860,659

UNITED STATES PATENT OFFICE

WALLACE K. CRILEY, OF LOS ANGELES, CALIFORNIA, ASSIGNOR, BY MESNE ASSIGNMENTS, OF ONE-HALF TO CARRIE CRILEY, OF LOS ANGELES, CALIFORNIA

ROTARY WELL DRILL GUIDE AND CENTERING DEVICE

Application filed August 26, 1929. Serial No. 388,489.

This invention relates to a rotary drill guide and centering device for a rotary well drilling apparatus, to act as a steady rest for the bit and power transmission.

The general object of the invention is to provide a rotary drill guide and centering device which will go into a hole the size of the drill bit, without interfering with the circulation.

A more particular object is to provide a device of the character stated with bearings that may be replaced without removing the device from the drill stem.

Another object is to provide a device of the character stated that may be placed at intervals, for example one hundred feet apart, on the drill pipe for steadying the stem as well as the drill.

A further object is to provide a device of the character stated that may be constructed of soft material so that it may be easily ground up by the drill bit should the device become stuck in the hole.

Other objects and advantages will appear hereinafter.

The invention is illustrated in the annexed drawings which form a part of this specification and in which Fig. 1 is an elevation of my invention shown mounted in position on a rotary drill collar and drill pipe.

Fig. 2 is a horizontal section of one form of my invention taken on line 2—2 of Fig. 3.

Fig. 3 is a longitudinal section of my invention taken on line 3—3 of Fig. 2.

Fig. 4 is a horizontal section of Fig. 3 taken on line 4—4.

Fig. 5 is a horizontal section taken on line 5—5 of Fig. 3.

Fig. 6 is a horizontal section of another form of my invention taken on line 6—6 of Fig. 7.

Fig. 7 is a longitudinal section of my invention taken on line 7—7 of Fig. 6.

Corresponding parts are designated by the same reference characters in all the figures.

My invention, as illustrated in Figs. 1, 2, and 3, includes generally a cage 1, formed with a lower bearing socket 2, an upper bearing socket 3, and vertical guide and centering members 4 connected at their lower and upper ends respectively to said bearing sockets and extended outwardly therefrom. Bearings 5 and 6 are fitted in the sockets 2 and 3 respectively. Retaining rings 7 and 8 are provided for retaining said bearings respectively in said sockets, and locking bolts 9 and 10 are provided for locking said retaining rings in retaining position.

The lower bearing socket 2 is formed at its lower end with an internal horizontal annular flange 11 and a vertical annulus 12 upstanding from the outer edge of said flange, which flange and annulus form an annular socket space 13 in which fits the lower bearing 5, said bearing resting at its lower end upon the annular flange.

The upper bearing socket 3 is formed at its upper end with an internal horizontal annular flange 14 and a vertical annulus 15 depending from the outer edge of said flange, which flange and annulus form an annular socket space 16 in which fits the upper bearing 6.

The vertical guide members 4 are preferably three in number spaced equi-distant apart. Each guide member is formed with an outer arcuate guide wall 17 and with three vertical ribs 18, 19 and 20 extending inwardly from said outer wall the full length thereof, the ribs 18 and 20 extending from the side edges of the outer wall and the rib 19 extending intermediate the ribs 18 and 20. The outer arcuate wall corresponds to an arc described from the center of the cage 1 while the ribs 18, 19 and 20 extend radially to said center.

Each of the retaining rings 7 and 8 is formed with three pairs of outwardly extending lugs 21 which respectively extend into the guide members 4, one lug of each pair extending between the ribs 18 and 19 of each guide member and the other lug of each pair extending between the ribs 19 and 20 of each guide member. The retaining ring 7 rests upon the upper end of the bearing 5 with its lugs 21 extending over the upper edge of the socket annulus 12, while a locking pin 9 extends through the ribs 18, 19 and 20 of each guide member 4 and over the retaining ring lugs 21 which extend between the ribs 18 and 19 and the ribs 19 and 20 of said guide member, whereby the retaining ring 7 is locked in position retaining the bearing 5 in the socket 2. The retaining ring 8 rests under the lower end of the bearing 6 with its lugs 21 extending under the lower edge of the socket annulus 15, while a locking pin 10 extends through the ribs 18, 19 and 20 of each guide member 4 and over the retaining ring lugs 21 which extend between the ribs 18 and 19 and the ribs 19 and 20 of said guide member, whereby the retaining ring 8 is locked in position retaining the bearing 6 in the socket 3. The rib 20 of each guide member 4 is provided with bores 22 extending therethrough, through which the pin 9 or 10 extends and which hold one end of the pins in locking position, while the rib 18 is provided with bores 23 extending from its inner side to receive the other end of pin 9 or 10 in locking position, the rib 19 being notched at 24 to permit the pins to extend across the rib. A plug 25 is screw seated in the outer end of each bore 22 for holding the pin 9 or 10 in locking position in bores 22 and 23. The rib 18 is provided also with bores 26 smaller than the bores 23, extending from the outer side of the rib 18 into the bores 23 respectively through which bore 26 a tool may be inserted against the adjacent end of the pin 9 or 10 for driving the pins out of the ribs 18, 19 or 20 when the plugs 25 are removed from the bores 22.

The bearings 5 and 6 may be of any suitable material, preferably tough rubber and may be split as at 27 so that they may be expanded around the drill collar 30 or drill pipe 31 to remove them from their sockets or to place them in their sockets without removing the cage 1 from the collar 30 or the drill pipe 31, which is extended centrally through the retaining rings 7 and 8. In removing or replacing the bearings 5 and 6 the retaining rings 7 and 8 are first moved away from the sockets 2 and 3 upon removing the bolts 9 and 10.

Two of my centering and guiding devices may be placed on the drill collar 30, one near the lower end of the collar directly above the bit 32 and one near the upper end thereof, as shown in Fig. 1, for centering and guiding the drill bit. Ring stops 33 and 34 are welded at 35 and 36 to the lower portion of the collar 30 between which stops the lower device of my invention is slidably mounted on the collar, said stops being adapted respectively to limit the downward and upward movements of the lower device on the collar. Ring stops 37 and 38 are welded at 39 and 40 to the upper portion of the drill collar 30 between which stops the upper device of my invention is slidably mounted on the collar, said stops being adapted respectively to limit the downward and upward movement of the upper device on the collar. A number of my devices may be placed on short sections 41 of the drill pipe 31 preferably one hundred feet, apart for centering and guiding the drill pipe, the joints 42 connecting said short sections to adjacent sections of the drill pipe serving as stops for limiting the up or down movement of the devices on the drill pipe.

The outer arcuate walls 17 of the guide members 4 engage the inner wall of the well 43 while the bearings 5 and 6 engage the drill stem for guiding and centering the drill bit 32 and drill stem in the well. For centering and guiding the drill pipe my invention may be placed thereon at suitable distances apart preferably one hundred feet.

The spaces 44 around the drill stem between the guide members 4 provides for sufficient circulation past the cage 1 while drilling.

The cage 1 and retaining rings 7 and 8 may be made of soft metal, such as bronze, which may be readily cut to pieces should the device become stuck in the hole. The bearings 7 and 8 in such event, inasmuch as they are of tough rubber, may easily be cut up and destroyed in case it should be impossible to dislodge and remove them with fishing tools.

With the two devices on the drill collar, if the bit starts to creep out of vertical position by contact with a dip of strata, the lower device above the bit will act as a fulcrum, while the upper device, in contact with the wall of the hole, will counteract such creeping action, thus holding the hole straight.

The form of my invention shown in Figs. 6 and 7 includes a cage 50 formed with a plurality of vertical segmental guide and bearing socket members 51 preferably three in number, lower segmental connecting members 52 connecting the lower ends of said guide and bearing socket members in equidistant spaced relation, and upper segmental connecting members 53 connecting the upper ends of said guide and bearing socket members in equi-distant spaced relation. Bearings 54 are fitted in the sockets 55 in said guide and bearing socket members. The sockets 55 are formed in the inner side of the guide and bearing socket members 51 and the side walls 56 of said sockets are undercut for engaging the beveled side edges 57 of the bearings 54 for retaining the bearings in the sockets. The lower end of the sockets are closed by walls 58 while the upper ends of the sockets are closed by walls 59 which engage the lower and upper ends respectively of the bearings 54 and prevent longitudinal displacement thereof. The spaces 60 formed between the guide and bearing socket members 51 provide for adequate circulation for drilling.

The above described form of my invention may be used on the drill pipe for centering and guiding the same, short sections 41 of the drill pipe about twice the length of the cage 1 and spaced about one hundred feet apart being provided to receive respectively a plurality of these devices, the joints 61 and 62 connecting the lower and upper ends of said short sections to adjoining sections of the drill pipe serving as stops for engaging the lower and upper ends of the cage for limiting the short downward and upward movement of the devices on the drill pipe, which is required for centering guiding purposes of the devices.

I do not limit my invention to the exact construction herein shown because various changes may be made in my invention without departing from the spirit thereof.

Having described my invention I claim:

A device as disclosed comprising a cage formed with a bearing socket at its lower end, a bearing socket at its upper end, and guide and centering bars connected at their ends to said sockets respectively, bearings fitted in said sockets, retaining rings for retaining said bearings in said sockets respectively, lugs on said retaining rings, ribs formed on said guide and centering bars between which said lugs project, and locking pins extending into said ribs and over said lugs for detachably locking said retaining rings in retaining position.

WALLACE K. CRILEY.